United States Patent Office 3,257,937
Patented June 28, 1966

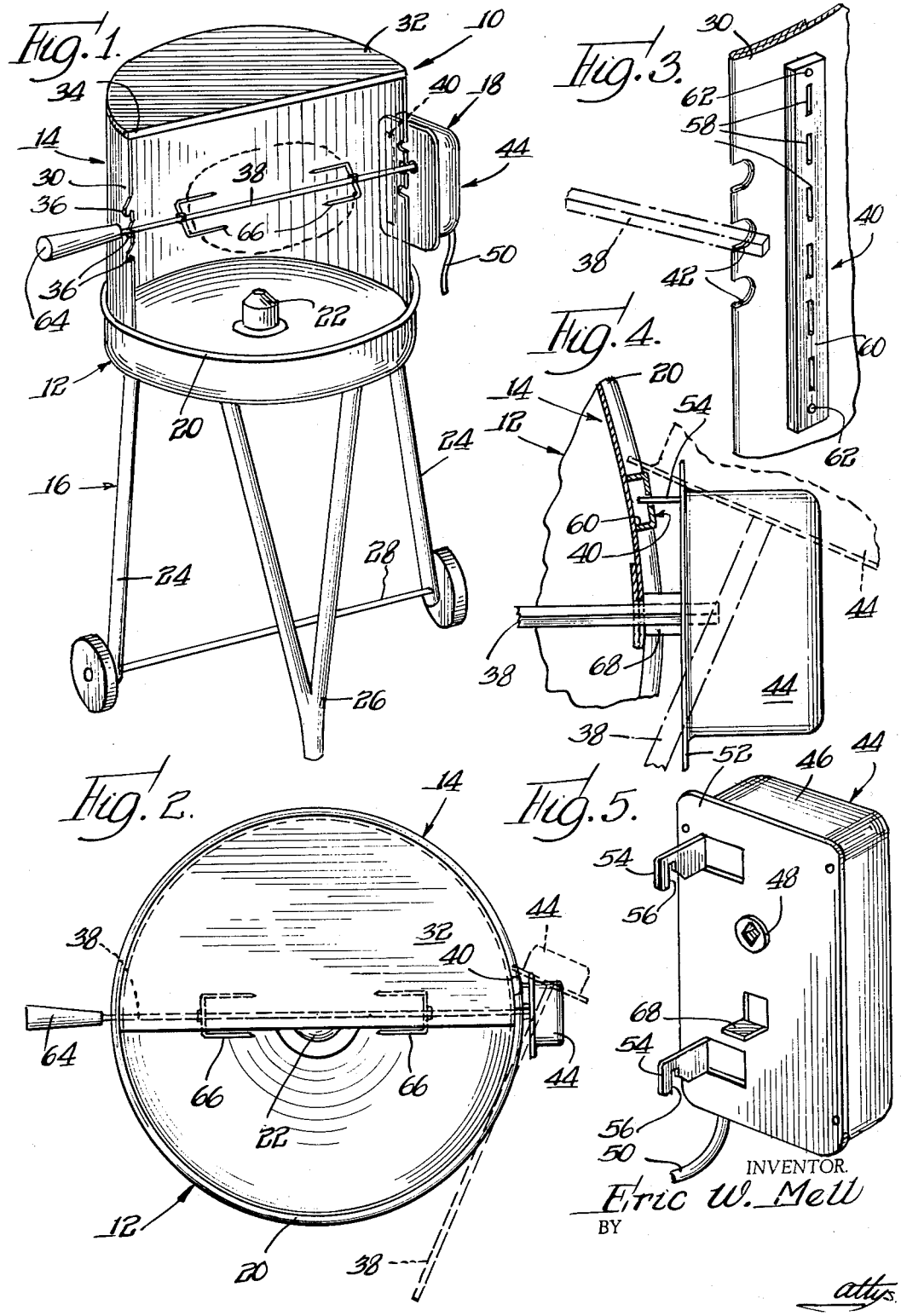

---

3,257,937
SPIT ARRANGEMENT FOR OUTDOOR GRILL
Eric W. Mell, Mound, Minn., assignor to Tonka Corporation, a corporation of Minnesota
Continuation of application Ser. No. 254,318, Jan. 28, 1963. This application June 22, 1965, Ser. No. 465,947
5 Claims. (Cl. 99—421)

This is a continuation of United States application for patent Serial No. 254,318, filed January 28, 1963 and now abandoned.

This invention relates generally to cooking chambers, more particularly to outdoor grills, and especially to motorized spits therefor.

It is old in patented barbecue rotisseries to couple a spit to a motor and to mount the motor to swing in a horizontal arc for repositioning the spit to a location away from the bed of hot coals. However, the prior art arrangements for mounting the motor have the marked disadvantage of being permanently hinged to the main structure of the barebecue unit. As a consequence, it is improvident to leave the unit out of doors due to the manifest possibility of damaging the motor upon exposing it to rains, lawn sprinkling and the like. Many owners of barbecue units find it inconvenient to house the unit during the season of intense use, being thereby faced with the decision of accepting these inconveniences or a shortened life of the drive assembly.

An important object of the present invention is, therefore, to provide a motorized spit arrangement that is both horizontally swingable relative to the main barbecue structure and detachable therefrom.

A more general object of the invention is to provide a new and improved barbecue grill arrangement.

A further object of the invention is to provide a barbecue unit having a motorized spit that is vertically adjustably positionable relative to the brazier tray.

A yet further object of the invention is to provide simple and inexpensive means for detachably and swingably mounting a spit drive arrangement to a barbecue unit.

These and other objects and features of the invention will become more apparent from a reading of the following descriptions.

A structure in accord with the invention includes a brazier tray, a spit, a hood upstanding from the brazier tray and having horizontally spaced, exposed edge portions adapted to cooperate in supporting the opposite ends of the spit, a hinge base member at one of the exposed edge portions including a hollow body having a plurality of vertical slots opening outwardly therefrom for use in mounting a spit drive unit, and a spit drive unit including means drivingly receiving one end of the spit and including a housing having spaced ears extending outwardly therefrom the ears having downwardly opening notches adapted to enter the slots of the hinge base member in hooked engagement with the edges of such slots whereby detachably and horizontally swingably to mount the spit drive unit to the hood.

The invention, both to its structure and mode of usage, will be better understood by reference to the following disclosure and drawing forming a part thereof, wherein:

FIG. 1 is a perspective view of a barbecue grill constructed in compliance with the principles of the present invention;

FIG. 2 is an enlarged plan view of the grill of FIG. 1, the motorized spit being shown in normal use position extending diametrically over the brazier tray and being indicated in broken outline as swung horizontally away from its position over the brazier tray;

FIG. 3 is an enlarged, fragmentary, perspective view of one edge portion of the hood of the grill of FIG. 1, illustrating in particular the hinge base member which is attached to an exterior surface of the hood;

FIG. 4 is an enlarged, fragmentary, plan view of the hinge base member and associated parts, the hinge base member being shown with the spit drive unit assembled thereto, the use position of the spit being shown in solid outline and the horizontally swung aside position being shown in broken outline; and FIG. 5 is an enlarged perspective view of the spit drive unit illustrating the struck out ears by which the unit is mounted to the hinge base member.

Referring now in detail to the drawing, specifically to FIG. 1, a barbecue grill unit indicated generally by the numeral 10 is shown to include a brazier tray 12, a half drum hood 14 upstanding from the brazier tray, a three point support 16 for elevating the brazier tray, and a motorized spit assembly 18 which is mounted to the hood 14 overlying the brazier tray 12. The brazier tray 12 is shown to comprise a moderately shallow pan or dish of circular shape and having a rolled edge 20. A central hub 22 upstands from the brazier tray 12 in order to arrange the coals so as to avoid a central hot spot and in order to provide a single mounting for the brazier tray. This single point of mounting may be of the pivotal type if desired.

While a single mounting for the brazier tray may be provided, the support 16 may also be connected to the brazier tray at various, spaced locations; and advantageously, the support 16 includes two wheeled legs 24 and a fixed leg 26. The wheeled legs 24 may be spaced at their lower ends by a strut 28, and the fixed leg 26 may comprise a straight member or a bifurcated member as shown. The provision of wheeled legs facilitates transport of the grill unit 10 while the provision of a fixed leg 26 prevents the grill unit from rolling when placed on an inclined surface.

The hood 14 serves as a windshield, as a heat reflector, and as a support structure for the motorized spit assembly 18; and while a half drum hood is shown, such shape being particularly advantageous with a circular brazier tray, the hood 14 may take other shapes convenient to the style and shape of the brazier tray. Specifically, the half drum hood 14 includes a semi-cylindrical sidewall 30 and a segment plate 32. The lower edges of the sidewall 30 are fitted inside the upstanding peripheral wall of the brazier tray to be bolted or welded in place. In addition, the segment plate 32 is provided with a depending marginal skirt 34 to receive the upper edge portion of the sidewall 30, bolts, screws or other fastening means being employed to secure the plate 32 to the sidewall 30. As will be recognized, the segment plate 32 adds rigidity to the hood structure 14 and roofs over a semi-circular area of the brazier tray as is well seen in FIG. 2.

Returning to a consideration of FIG. 1, one exposed edge portion of the sidewall 30 is seen to be fashioned with vertically spaced and downwardly inclined notches 36 for receiving and journaling one end of a spit rod 38. When the spit rod 38 is provided with a square or other non-circular cross-section, one or more grooves with cylindrical floors are provided on the spit rod to cooperate with the notches 36. At the opposite, exposed edge portion, the semi-cylindrical sidewall 30 receives a hinge base member 40 best seen in FIG. 3. This hinge base member 40 is provided for purposes of mounting the drive unit of the motorized spit assembly 18 and is secured to a convex outer surface of the sidewall 30 in order to situate such drive unit away from the brazier tray. Adjacent the hinge base member 40, the sidewall 30 is fashioned with vertically spaced notches 42 which cooperate in passing the spit rod 38 to a drive unit that is indicated throughout the figures by the numeral 44.

With reference to FIG. 5, the spit drive unit 44 is seen to include a housing 46 and a coupling element 48 that extends through the housing for drivingly receiving one end of the spit rod 38. The housing 46 encloses an electric motor and a speed reducer according to conventional practice, the electric motor being connected to a suitable source of power by means of a cable 50 and the coupling element 48 being connected to the output shaft of the electric motor through the speed reducer in any well known manner. An on-off switch may also be provided if desired.

The housing 46 of the spit drive unit includes a planar back plate 52; and in order to mount the drive unit 44 to the hinge base member 40, vertically spaced ears 54 are struck out from the back plate 52. The ears 54 are fashioned with downwardly opening notches 56; and the hinge base member 40 is cooperatively provided with a number of vertical slots 58 which open outwardly therefrom for receipt of the ears 54. As will be seen in FIG. 3, the slots 58 are arranged in pairs and are vertically spaced apart for receipt of the ears 54 in selected positions vertically above the brazier tray; and in order to receive the ears 54, the hinge base member 40 is fashioned as a hollow body 60 which defines the slots 58. The hollow body 60 is fastened to the sidewall 30 by rivets 62 or other suitable fasteners.

The slots 58 are formed in the shape of narrow rectangles having parallel edges. On the other hand, each of the notches 56 in the ears 54 includes a vertical outer edge and an inclined inner edge, this inclined inner edge serving to lead the edge of a receiving slot 58 into juxtaposition with the vertical edge. Thus, the ears 54 fit into the slots 58 in hooked engagement therewith. The spit drive unit 44 is thus securely attached to the side wall 30 of the hood for normal usage, although the drive unit 44 may also be readily detached by lifting the unit to release the hooked engagement of the ears and permit withdrawal of the ears from slots in the hinge base member. Moreover, since the hinge base member comprises the hollow body 60, those portions of the ears 54 which reside within the hollow body are permitted to swing freely therein whereby to develop a hinge action between the spit drive unit and the hinge base member. This freedom of movement is apparent from an inspection of FIG. 4.

A handle element 64 and longitudinally adjustably positionable forks 66 are advantageously assembled to the spit rod 38, the forks 66 being confrontingly disposed for use in positioning a roast on the spit rod. Moreover, an abbreviated arm 68 is struck out from the back plate 52 of the spit drive housing 46 as is shown in FIG. 5; and this abbreviated arm acts as a horizontal stop, abutting the sidewall 30 of the hood as is shown in FIG. 4 arresting movement of the spit drive unit in the direction generally toward the hood.

In use of the barbecue grill unit 10, a selected position of the spit rod 38 above the brazier tray 12 is achieved by inserting the ears 54 of the drive unit in an appropriate pair of the slots 58, the spit rod passing through an appropriate notch 42 in the adjacent margin of the hood sidewall 30 and the opposite end of the spit rod being positioned in a corresponding one of the journal notches 36. If it is desired to locate the spit rod in an intermediate vertical position, the ears 54 will be positioned in the second and fifth of the slots 58; the adjacent end of the spit rod will pass through the medial notch 42; and the opposite end of the spit rod will be disposed in the medial notch 36. The spit rod may be repositioned to a higher and to a lower position in corresponding manner.

Furthermore, the cooperation between the ears 54 and the hollow, slotted body 60 permits the spit rod 38 to be swung out in a horizontal arc as is indicated in the broken line illustrations in FIGS. 2 and 4. This permits a roast or other object to be positioned on the spit rod for cooking over the bed of coals contained in the brazier tray 12 and permits momentary removal of such a roast from over the coals, as for basting, without the necessity for the user to expose himself to the heat from the coals. Finally, the ready extractability of the ears 54 from the slots 58 permits easy detachment of the spit drive unit 44 from the remainder of the barbecue grill; and this allows the drive unit to be stored indoors while the bulky body of the grill is left outdoors.

While a particular embodiment of the invention has been shown and described, it should be understood, of course, that the invention is not limited thereto since many modifications may be made. Such changes are, therefore, to be considered as forming a part of this invention insofar as they fall within the spirit and scope of the appended claims.

I claim:

1. In a barbecue grill, the combination comprising: a brazier tray; a spit; structure means upstanding from said tray and having horizontally spaced portions disposed above opposite edges of said tray to cooperate in supporting the opposite ends of said spit in a position vertically above said tray, one of said portions defining a downwardly inclined notch for receiving and journaling one end of said spit; hinge base means mounted on the outside surface of the opposite portion including a hollow body having a pair of vertical slots opening outwardly therefrom and spaced vertically apart for use in mounting a spit drive unit laterally from the vertical projection of said tray, said slots being generally horizontally aligned with said notch for use in positioning the opposite end of said spit; and a spit drive unit including coupling means drivingly receiving said opposite end of the spit and including a housing having a pair of vertically aligned and spaced ears extending outwardly therefrom, said ears having downwardly opening notches disposed in said slots in hooked engagement with the edges thereof for detachably and swingably mounting said unit to said hinge base means and for aligning said coupling means with said inclined notch to properly position the coupled end of said spit.

2. In a barbecue grill, the combination according to claim 1 wherein said structure means is a halfdrum hood and wherein said hinge base means is secured to a convex outer surface thereof whereby to situate said drive unit away from said brazier tray.

3. In a barbecue grill, the combination according to claim 1 wherein said slots have parallel edges and wherein each of the notches in said ears has a vertical outer edge and an inclined inner edge for leading the edge of a receiving slot into juxtaposition with said vertical edge.

4. In a barbecue grill, the combination comprising: a brazier tray; a spit; structure means upstanding from said tray and having horizontally spaced portions disposed above opposite edges of said tray to cooperate in supporting the opposite ends of said spit in a position vertically above said tray, one of said portions defining vertically spaced and downwardly inclined notches for receiving and journaling one end of said spit in a selected vertical position; hinge base means mounted on the outside surface of the opposite portion including a hollow body having pairs of separate vertical slots opening outwardly therefrom and spaced vertically apart for use in mounting a spit drive unit laterally from the vertical protection of said tray, each pair of said slots corresponding positionally to one of said notches; and a spit drive unit including coupling means drivingly receiving the opposite end of said spit and including a housing having a pair of spaced ears extending outwardly therefrom, said ears having downwardly opening notches disposed in a selected pair of said slots in hooked engagement with the edges thereof for detachably and horizontally swingably mounting said unit to said hinge base means and for aligning said coupling means with said inclined notches to properly position the coupled end of said spit in alignment with the notch selected for supporting the remote end of said spit.

5. In a barbecue grill, the combination comprising: a brazier tray; a spit; a structure means upstanding from said tray and having horizontally spaced portions disposed above opposite edges of said tray to cooperate in supporting the opposite ends of the spit in a position vertically above said tray, one of said portions defining a plurality of notches arranged in vertically spaced relation for selectively receiving and journaling one end of said spit; hinge base means on the opposite portion generally horizontally aligned with said notches for use in positioning the opposite end of the spit, said hinge base means forming a plurality of vertically spaced pairs of openings having vertically spaced and aligned upwardly facing edges; a spit drive unit including coupling means drivingly receiving said opposite end of the spit and including a mounting plate having a pair of vertically spaced and aligned horizontally elongated ears extending outwardly therefrom, said ears having downwardly opening hook portions in downwardly hooked engagement with a selected pair of said edges for swingably mounting said unit to said hinge base means and for aligning said coupling means horizontally opposite any selected one of said notches to properly position the coupled end of the spit, said hook portions being spaced outwardly from the plate at the extended ends of the ears to support the drive unit in spaced relation to the structure means and laterally from the vertical projection of the tray and forming the sole means of connection between the spit drive unit and hinge base means whereby the unit may be freely detached from the hinge base means by merely lifting the unit to raise said hook portions from said edges.

References Cited by the Examiner
UNITED STATES PATENTS

| | | |
|---|---|---|
| 638,134 | 11/1899 | Ohnemus. |
| 682,998 | 9/1901 | Rauen _____ 16—172 |
| 1,874,426 | 8/1932 | Berggren _____ 16—172 |
| 2,797,633 | 7/1957 | Goodwin _____ 99—421 |
| 2,968,059 | 1/1961 | Munson _____ 16—172 |
| 3,168,862 | 2/1965 | Clouser _____ 99—421 |

WALTER A. SCHEEL, *Primary Examiner.*

STANLEY P. FISHER, *Assistant Examiner.*